US008933951B2

(12) United States Patent
Nath et al.

(10) Patent No.: US 8,933,951 B2
(45) Date of Patent: Jan. 13, 2015

(54) TECHNIQUES FOR CONTROLLING FRAME REFRESH

(75) Inventors: Siddhartha Nath, Bangalore (IN); Suresh Kumar, Bangalore (IN); Rama Gopal Musunuri Satyanantha, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 413 days.

(21) Appl. No.: 13/071,774

(22) Filed: Mar. 25, 2011

(65) Prior Publication Data

US 2011/0242116 A1 Oct. 6, 2011

(30) Foreign Application Priority Data

Mar. 31, 2010 (IN) ............................ 799/DEL/2010

(51) Int. Cl.
*G06T 1/00* (2006.01)
*G09G 5/36* (2006.01)

(52) U.S. Cl.
CPC ............ *G09G 5/363* (2013.01); *G09G 2360/18* (2013.01); *G09G 2340/12* (2013.01)
USPC ........................................... 345/545; 345/522

(58) Field of Classification Search
USPC .................................................. 345/545, 522
See application file for complete search history.

(56) References Cited

U.S. PATENT DOCUMENTS

| | | | | |
|---|---|---|---|---|
| 5,212,544 | A * | 5/1993 | Kellar et al. | 348/590 |
| 5,274,760 | A * | 12/1993 | Schneider | 345/506 |
| 2003/0156083 | A1* | 8/2003 | Willis | 345/84 |
| 2006/0061581 | A1* | 3/2006 | Willis et al. | 345/545 |
| 2007/0109292 | A1* | 5/2007 | Dahan et al. | 345/211 |
| 2007/0152993 | A1* | 7/2007 | Mesmer et al. | 345/211 |
| 2008/0001934 | A1 | 1/2008 | Wyatt | |
| 2010/0080218 | A1 | 4/2010 | Kwa et al. | |
| 2010/0123727 | A1 | 5/2010 | Kwa et al. | |

FOREIGN PATENT DOCUMENTS

| | | | |
|---|---|---|---|
| CN | 101292278 | A | 10/2008 |
| TW | I267051 | B | 11/2006 |

OTHER PUBLICATIONS

"VESA DisplayPort Standard", Video Electronics Standards Association, Version 1, Revision 1a, Jan. 11, 2008, 238 pages.

Office Action received for Taiwan Patent Application No. 100110987, mailed on Mar. 28, 2014, 26 pages of Office Action Including 12 pages of English Translation.

Office Action Received for Taiwanese Patent Application 100110987, mailed on Oct. 23, 2013, 14 pages of Office Action including 11 pages of English Translation.

* cited by examiner

*Primary Examiner* — David Zarka
*Assistant Examiner* — Sohum Kaji
(74) *Attorney, Agent, or Firm* — Lynch Law Patent Group, P.C.

(57) ABSTRACT

Techniques are described that track the lines and pixels in a frame buffer in the host system that are being modified and transmit these modified scan lines and modified pixel locations to the self refresh display instead of entire contents of the frame buffer. The graphics adapter informs the self refresh display of the modified scan lines or pixel information and then sends the pixel data over the communications channel to the display. Custom codes can be used to identify and transmit modified scan lines and pixels to the self refresh display logic.

20 Claims, 7 Drawing Sheets

TECHNIQUES FOR CONTROLLING FRAME REFRESH

RELATED APPLICATION

This application is related to Foreign Indian Patent Application Serial No. 799/DEL/2010, entitled "TECHNIQUES FOR CONTROLLING FRAME REFRESH", filed on Mar. 31, 2010 and claims priority there from.

FIELD

The subject matter disclosed herein relates generally to programming a self refresh display device.

RELATED ART

Many mobile computing devices include self refresh display logic. Self refresh displays have access to a local memory that stores an active display frame. When frames from the host computer are not changing, the host computer transfers the last frame buffer to the self refresh display and the host computer's display sub-system is turned-off or put into a low power state. Meanwhile, the display continues to display the saved frame from its local memory. This can help reduce power consumption and increase the battery life of the computing device.

BRIEF DESCRIPTION OF THE DRAWINGS

Embodiments of the present invention are illustrated by way of example, and not by way of limitation, in the drawings and in which like reference numerals refer to similar elements.

DETAILED DESCRIPTION

Reference throughout this specification to "one embodiment" or "an embodiment" means that a particular feature, structure, or characteristic described in connection with the embodiment is included in at least one embodiment of the present invention. Thus, the appearances of the phrase "in one embodiment" or "an embodiment" in various places throughout this specification are not necessarily all referring to the same embodiment. Furthermore, the particular features, structures, or characteristics may be combined in one or more embodiments.

Various embodiments track the lines and pixels in a frame buffer in the host system that are being modified and transmit these modified scan lines or modified pixels to the self refresh display instead of entire contents of the frame buffer. The graphics adapter informs the self refresh display of the modified scan lines or pixel information and then sends the pixel data over the communications channel to the display. Custom codes can be used to identify and transmit modified scan lines and pixels to the self refresh display logic. Transmitting merely modified scan lines or modified pixel data may transfer a smaller amount of data to the display. Consequently, memory accesses in the host system can be reduced and the display pipeline can be turned off faster to save power and battery life.

Figure 1:
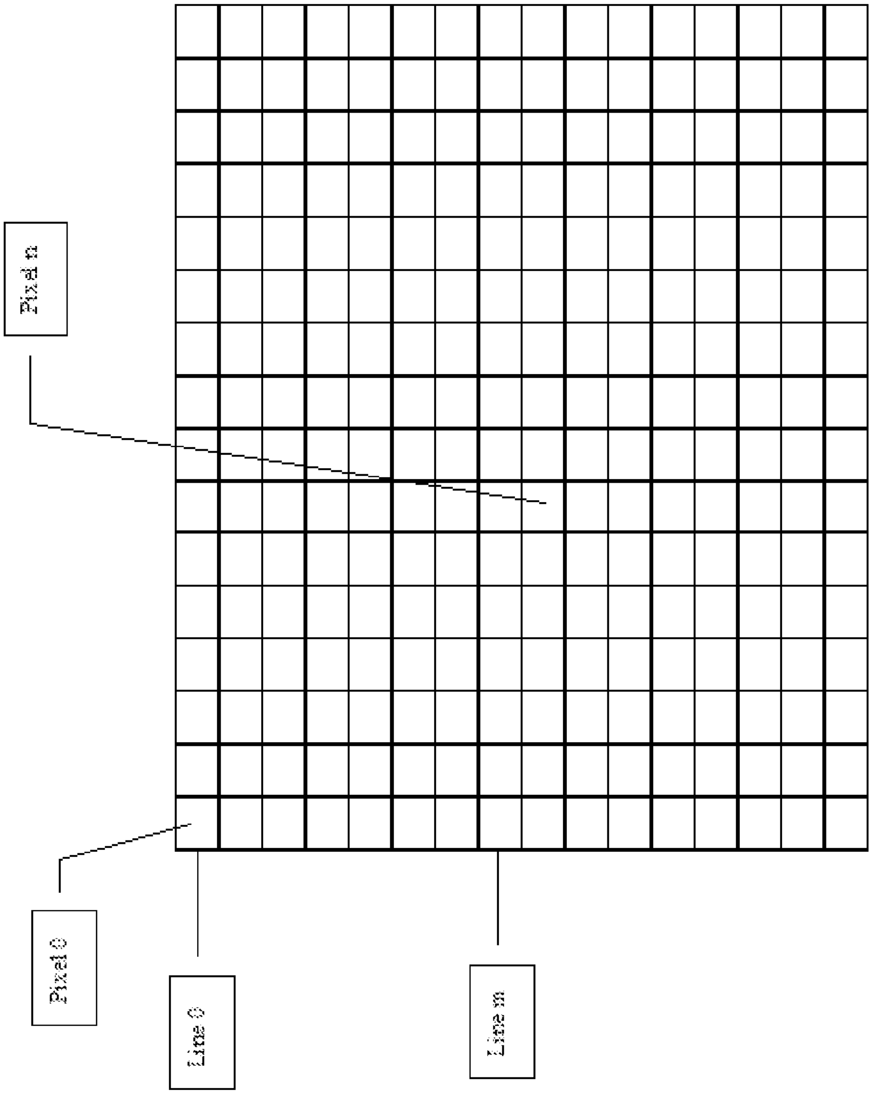
FIG. 1 depicts an example of a memory layout of pixels of a frame that can be displayed on a display device.

FIG. 1 depicts an example of a layout of pixels on a display device. A display frame is characterized by horizontal active pixels and vertical active scan lines. If there are X horizontal active pixels and Y vertical scan lines, there are a total of X*Y pixels in the frame. Each of the pixels or scan lines is either a single memory location or a series of memory locations and is uniquely addressable by the memory controller in the self refresh display. Pixels do not have to be stored in memory in the order depicted. Information concerning a pixel can span several memory locations, e.g., 8 bits, 16 bits, 24 bits, and so forth.

Figure 2:
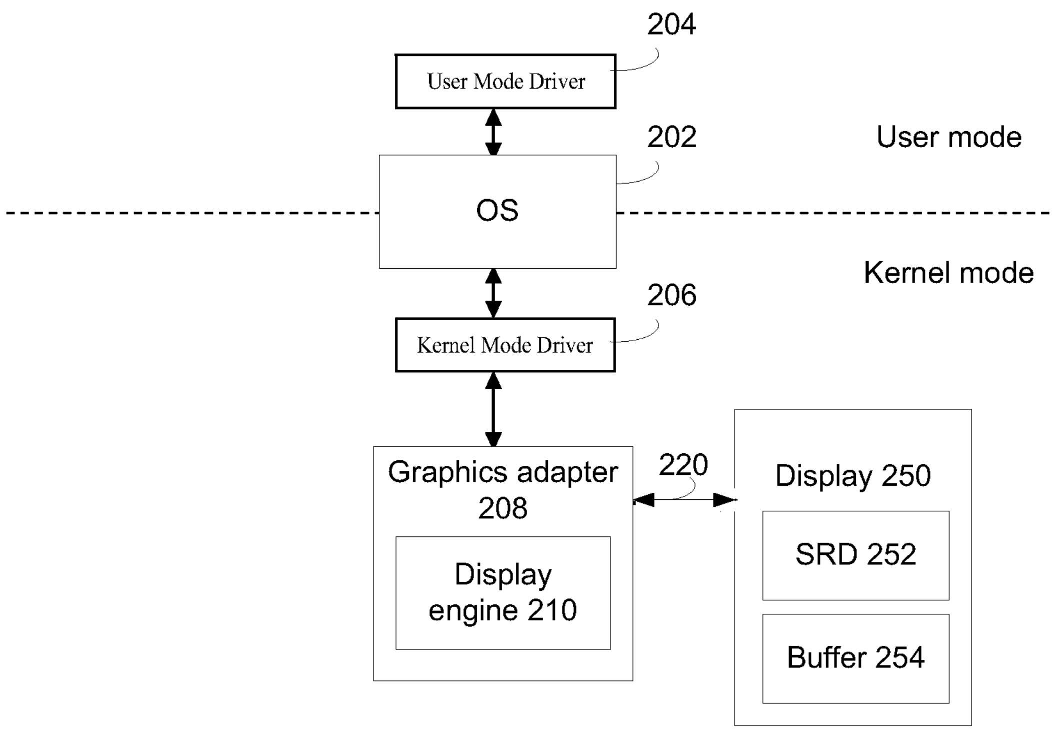
FIG. 2 depicts a system that can be used to determine which lines and pixels to draw to a display buffer in accordance with an embodiment.

FIG. 2 depicts a system that can be used to determine which lines and pixels to draw to a display buffer in accordance with an embodiment. In particular, FIG. 2 shows the graphics driver architecture in a Windows Display Driver Model based systems such as those that utilize Windows Vista Operating System (OS), Windows 7, Windows 8, and variations thereof. However, the system can be used with other operating systems such as, but not limited to, Linux, MacOS, and Solaris. An application (not depicted) issues draw calls to the OS 202. OS 202 transmits render operations to the user mode driver (UMD) 204 by specifying the rectangle and an intended operation for the rectangle using surface handles. OS 202 can inform UMD 204 to write dirty rectangles to an intermediate or flip buffer. A dirty rectangle is any rectangle of any dimension that is either meant to be written to a flip buffer and to be drawn on screen or is to be placed into an intermediate buffers called render targets. The intermediate buffer can be used to process images to produce a final displayable image and contents of the intermediate buffer are not drawn on screen. The dimensions of a rectangle can be 1 pixel by 1 pixel or an entire area of a screen.

OS 202 can identify dirty rectangles to UMD 204 by using handles to surface descriptors. A handle is a pointer to a data element that describes properties and uses of the rectangles requested to be drawn. Contents of the flip buffer are available for display in response to OS 202 asking kernel mode driver (KMD) 206 to flip a flip buffer. A surface handle with draw calls from OS 202 indicates whether flipping is to take place. Flipping a buffer means the contents of the flipped buffer are to be shown on screen. In some embodiments, OS 202 asks for a flip on a flip buffer when there are some changes to the contents of the flip buffer. Accordingly, when OS 202 has asked KMD 206 to flip a flip buffer and dirty rectangles are in the flip buffer, the dirty rectangles are considered portions of a displayable screen that have changed. In various embodiments, KMD 206 could perform a pixel-by-pixel comparison between pixels of a current frame and a previous frame to determine which pixels have changed.

UMD 204 tracks all dirty rectangles for each buffer and passes the tracking to KMD 206. For example, UMD 204 can create a list of dirty rectangles for each buffer that is written to. KMD 206 identifies the dirty rectangles that are to be displayed and converts these dirty rectangles to scan line information. A rectangle has x and y coordinates in the screen coordinate space, which identify beginning and end corners of the rectangle. Using the coordinates of the dirty rectangles, KMD 206 identifies the changed pixels within each changed scan line. KMD 206 identifies the changed lines and changed pixels as modified partial scan lines and pixel information to the self refresh display. KMD 206 transmits these modified scan lines and pixels to the display sub-system within the graphics adapter hardware using registers. Accordingly, KMD 206 has the capability of transmitting entire contents of a flip buffer to buffer 254 or merely modified pixels. In some cases, such as when the modified scan lines are spread across the entire screen, KMD will decide to transmit the entire contents of flip buffer instead of modified lines and pixels.

Display engine 210 of graphics adapter 208 can use custom codes to inform the self refresh display (SRD) logic 252 that only modified scan lines and pixels will be transmitted. The codes depend on the protocols supported by interface 220 between graphics adapter 208 and self refresh display logic 252. If interface 220 is inter-integrated circuit (I2C) compliant, then the custom code is compliant with I2C. Interface 220 may include a Main Link and an AUX channel, both described in Video Electronics Standards Association (VESA) DisplayPort Standard, Version 1, Revision 1a (2008) and Version 1.2 (2009). An AUX channel can be used to communicate the codes and to transfer modified scan lines and pixels to buffer 254.

Display engine 210 fetches the modified scan lines or modified pixels from the memory in which the frame is stored. Display engine 210 transmits pixel data to self refresh display 252 for storage in buffer 254 using display timing information of only these modified scan lines and pixels. The display timings (e.g., pixel clock, Hsync, and Vsync) used for transmission of a full frame buffer from display engine 210 to buffer 254 are also used to transmit the modified scan lines/pixel information to the buffer 254. The following provides an example of signals transmitted to buffer 254.

For a first line of pixels:

VSYNC<zero padded pixels><modified pixels><zero padded pixels>HSYNC [on main link]

A line of pixels other than the first line:

HSYNC<zero padded pixels><modified pixels><zero padded pixels>HSYNC [on main link]

Additionally, display engine 210 handles appropriate watermark levels in pipe first-in-first-out (FIFO) registers located in display engine 210 to prevent pipe under-runs. The memory controller of self refresh display 252 updates the memory locations in buffer 254 that have changed based on the incoming data from display engine 210.

After these lines or pixels are transmitted to the display, display engine 210 of graphics adapter 208 can be turned off and the graphics video memory that includes the flip buffer can be put into self refresh so that additional power is saved.

Graphics adapter 208 informs self refresh display 252 about the start of scan line and pixel number and end of scan line and pixel number that are transmitted from graphics adapter 208. Self refresh display 252 receives data of the scan lines or pixel numbers marked by start and end, both inclusive. Transmitted contiguous pixels represent a portion of a line segment. Graphics adapter 208 transmits only modified pixels to SRD 252 as part of the frame data using the display specific encoding. For example, low voltage differential signaling (described in ANSI/TIA/ELA-644-A (2001)), DisplayPort standard 1.1a (2008) or version 1.2 (2009) and revisions and variations thereof can be used to transmit scan lines. Graphics adapter 208 can send a group of consecutive modified pixels to buffer 254 that represent part of a scan line instead of the entire scan line. Buffer 254 is a buffer accessible to display 250. Buffer 254 may be located inside the display or may be accessible to display 250. In some cases, buffer 254 is located within a host system or is accessible by host system.

The memory controller of self refresh display 252 can address a scan line or specific pixel locations shown in FIG. 1. Self refresh display 252 is able to identify modified scan lines or pixel information and overwrite only those scan lines or pixels into buffer 254. Thereafter, when in self refresh display mode, self refresh display 252 displays frames from buffer 254 with previously displayed scan lines or pixels and updated scan lines or pixels. Self refresh display 252 may use a timing controller (TCON) that has the capability to respond to instructions from a host device to enter a self refresh mode that may include powering down components and/or capturing an image and repeatedly outputting the captured image to a display. TCON will exit out of self refresh mode after receiving another full frame and will wake up all necessary units.

Figure 3A:
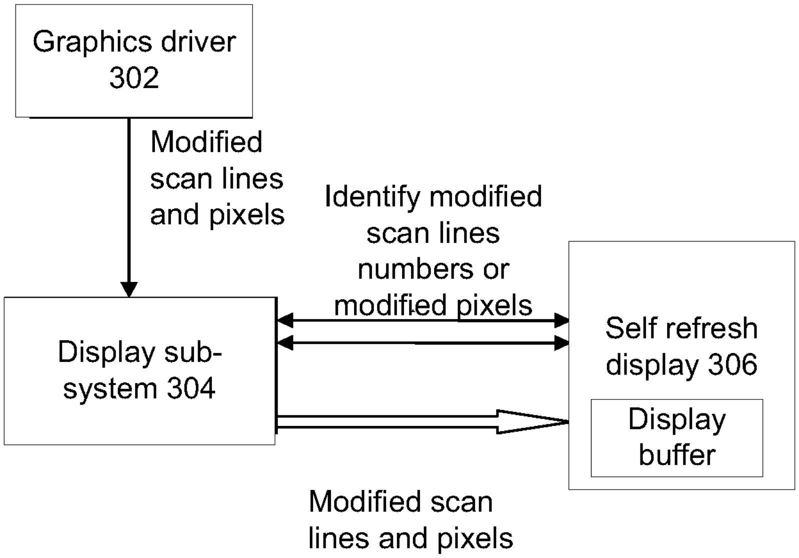
FIG. 3A depicts a flow of information between a graphics driver, display sub-system, and a self refresh display.
Figure 3B:
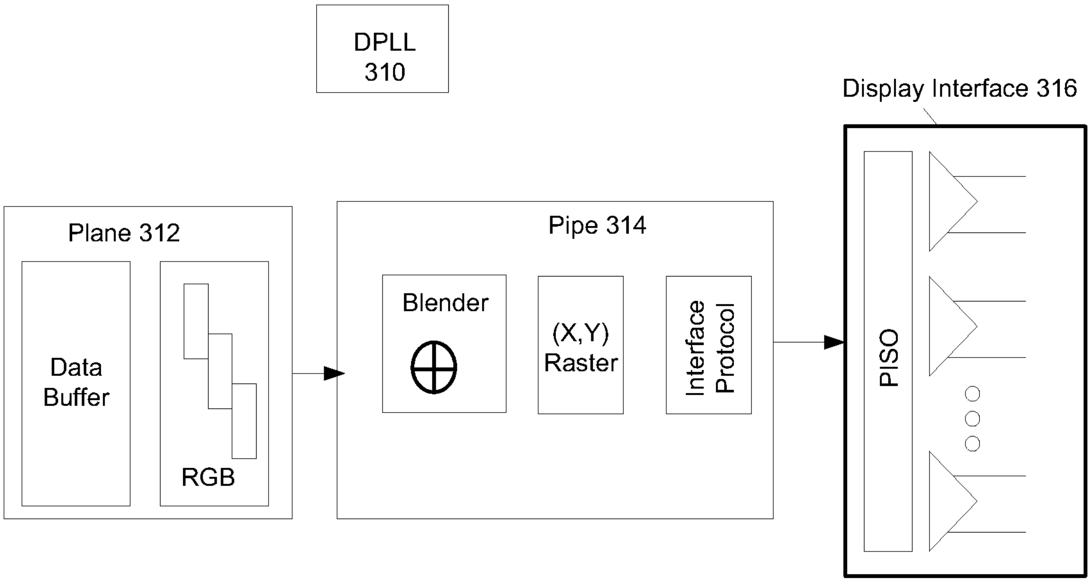
FIG. 3B depicts an example of some components of host system whose power consumption can be controlled, in accordance with an embodiment.

FIG. 3B depicts an example of components of a host system whose power consumption can be controlled, in accordance with an embodiment. Components of the host system are not limited to these components alone. The components can be in chipset, processor, or graphics subsystem. For example, the display phase lock loop (PLL) 310, display plane 312, display pipe 314, and display interface 316 of host system can be powered down or up. PLL 310 may be a system clock for the display plane 312, display pipe 314, and display interface 316. For example, display plane 312 may include a data buffer and RGB color mapper, which transforms data from buffer to RGB. Display plane 312 may include an associated memory controller and memory IO (not depicted) that could also be power managed. Pipe 314 may include a blender of multiple layers of images into a composite image, X, Y coordinate rasterizer, and interface protocol packetizer. Display interface 316 may include a DisplayPort or LVDS compatible interface and a parallel-in-serial-out (PISO) interface. Low-voltage differential signaling (LVDS) is available from ANSI/TIA/EIA-644-A (2001). Memory of the host system can be placed into lower power self refresh mode and, in addition, phase locked loops (PLLs) can be turned off.

As an example, consider a frame of size of 1600×1200×32 bits-per pixel being sent to the display with a refresh rate of 60 Hz. In current systems, the entire 7.32 megabytes of frame data is sent. According to various embodiments, if only 10 scan lines changed from the last frame, only 62.5 kilobytes of data may be transmitted. This allows the graphics video memory in the host system to enter lower power mode and turning off of display pipeline in the host system faster to save power and increase battery life.

Reducing the amount of data transmitted for display has at least three advantages, although these advantages are not necessary features of any embodiment.

1. Less amount of data fetched from graphics video memory that includes the flip buffer. This frees up memory bandwidth for other clients in the system thus improving system performance.
2. Graphics video memory in the host system can enter self refresh faster thus saving more power.
3. Display engine in the host system can be turned off faster, again, saving more power.

FIG. 3A depicts a flow of information between a graphics driver 302, display sub-system 304, and a self refresh display 306. Graphics driver 302 provides modified scan lines and modified pixels to display sub-system 304. Display sub-system 304 informs self refresh display 306 that self refresh display 306 will receive modified scan lines and modified pixels. In addition, display sub-system 304 provides the modified scan lines and modified pixels to self refresh display 306. Self refresh display 306 stores the modified scan lines and modified pixels into a display buffer by overwriting previous scan lines and pixels. In addition, self refresh display 306 refreshes the display device with the contents of the display buffer.

Figure 4:
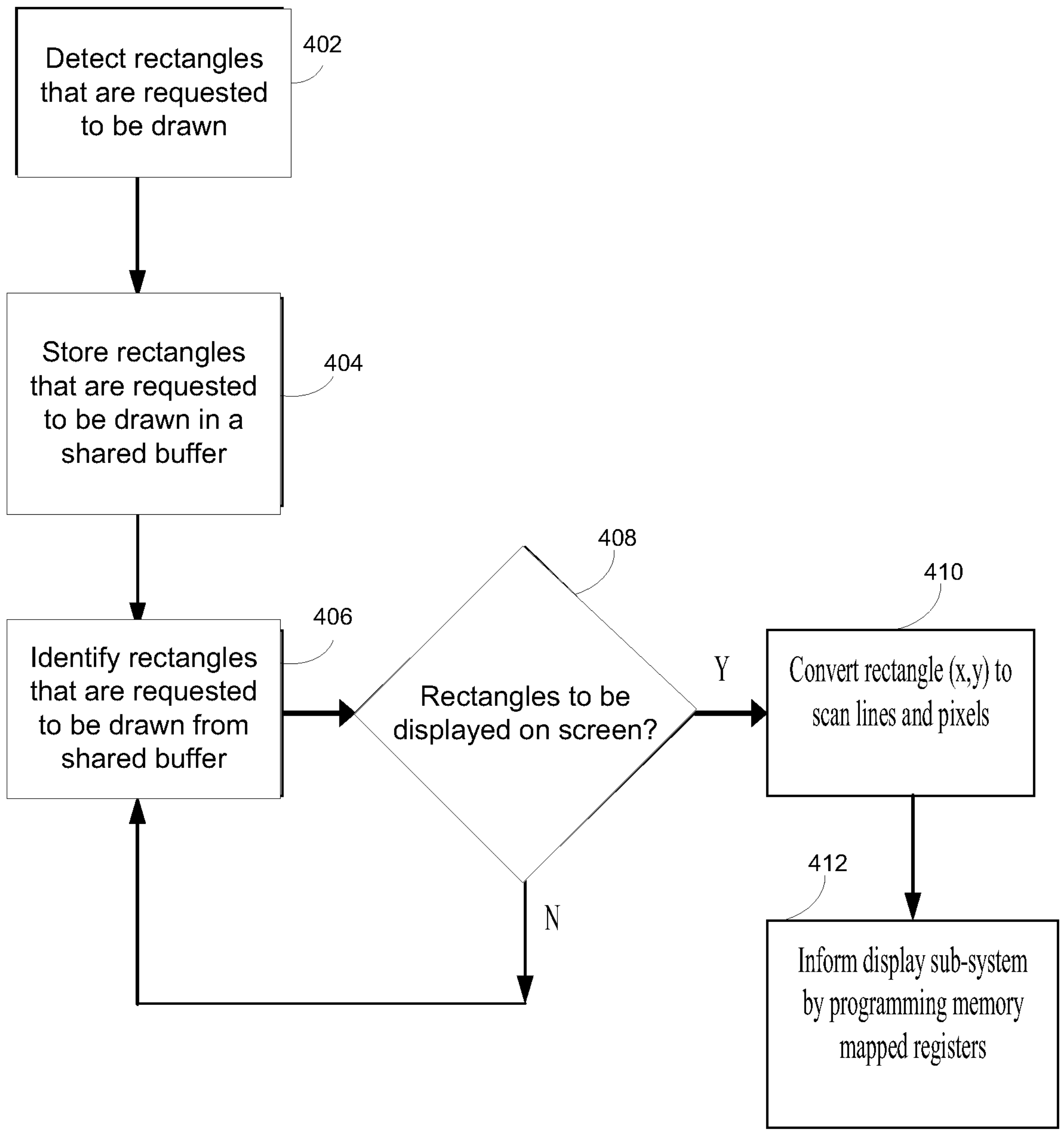
FIG. 4 depicts a flowchart of a manner to identify and transmit images to a self refresh display.

FIG. 4 depicts a flowchart of a manner to identify images to transmit to a self refresh display. Block 402 includes the UMD detecting rectangles in an image that are requested to be drawn. The request can be received from an OS. Block 404 includes the UMD storing rectangles requested to be drawn per surface in a data structure shared with a KMD. Block 406 includes the KMD identifying rectangles that are requested to be drawn from the shared buffer. KMD will inspect the shared buffer to inspect the rectangles and KMD will only consider the rectangles pertaining to the flip/display buffers.

Block 408 includes the KMD determining whether the rectangles of a surface are to be drawn to a screen. In some cases, the surface associated with rectangles is to be drawn to a screen when the rectangles are to be stored in a flip buffer or a flip chain buffer and the flip buffer is requested to be flipped. If the surface is to be displayed to a screen, then block 410 follows block 408. If the surface is not to be displayed to a screen, then block 406 follows block 408.

Block 410 includes the KMD converting the rectangles to be drawn to a screen to scan lines and pixel locations. Block 412 includes the KMD informing the display sub-system to update display of an image by programming registers with modified scan lines/pixels that are to be drawn to a screen. In an embodiment, these registers may be memory mapped when memory mapped input/output is used to read/write into device registers. The display sub-system may receive only the modified line/pixels.

Figure 5:
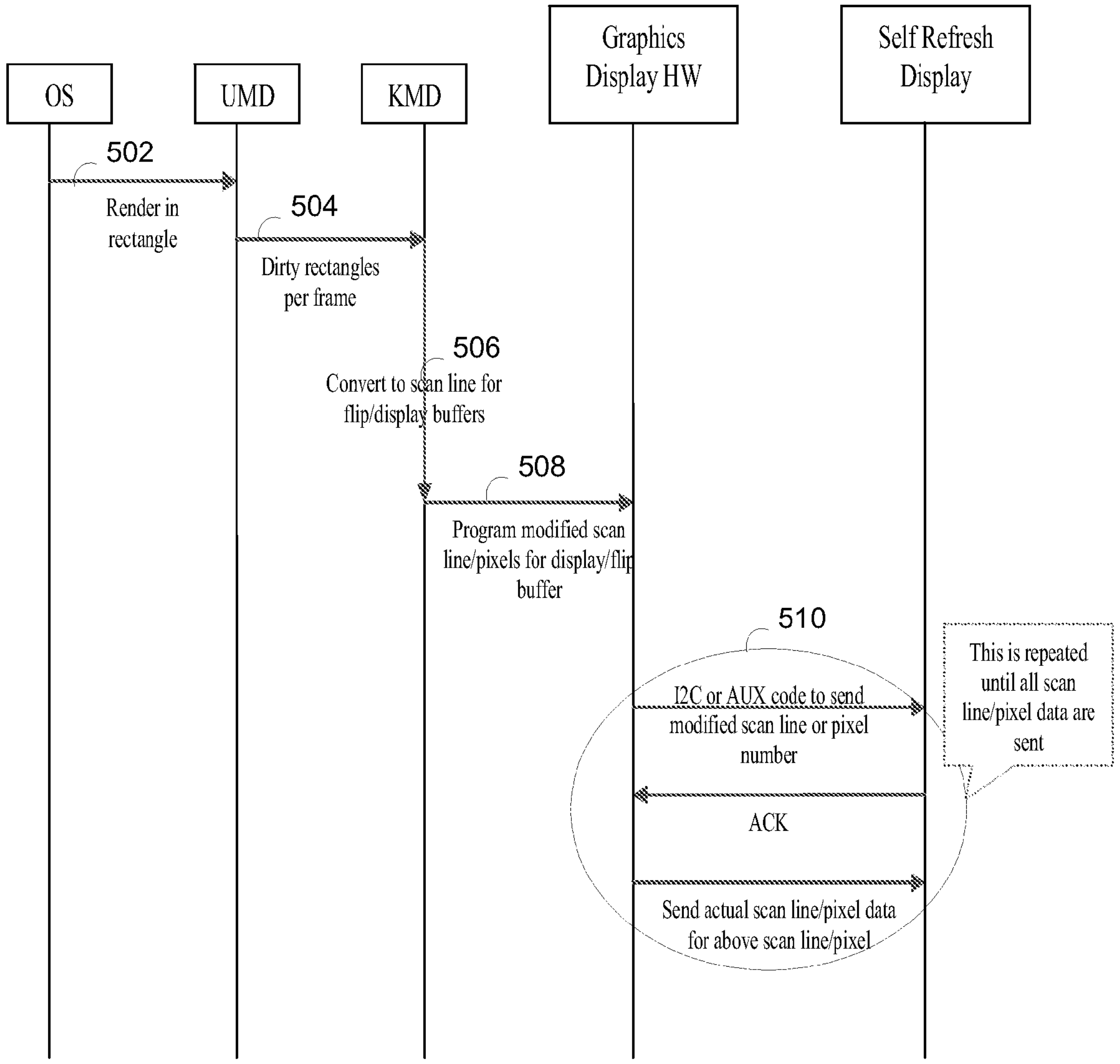
FIG. 5 shows an example sequence of events to identify and transmit images to a self refresh display.

FIG. 5 shows an example sequence of events that can be used to transmit contents for display. At 502, the OS instructs the UMD to render an image in a frame that was previously drawn to a screen. At 504, the UMD determines which rectangles in the frame are to be changed and identifies which rectangles in the frame are to be changed to the KMD. A dirty rectangle in a frame is any rectangle that is going to be drawn to a frame. For dirty rectangles written to a flip buffer that is to be flipped, at 506, the KMD converts dirty rectangles to scan line and pixel locations for flip display buffers. At 508, the KMD stores modified scan lines and pixels into a buffer used by the self refresh display to display frames. Next, at 510, the graphics display hardware interacts with the self refresh display logic to program the self refresh to write the dirty rectangles to the buffer used to refresh the display.

Figure 6:
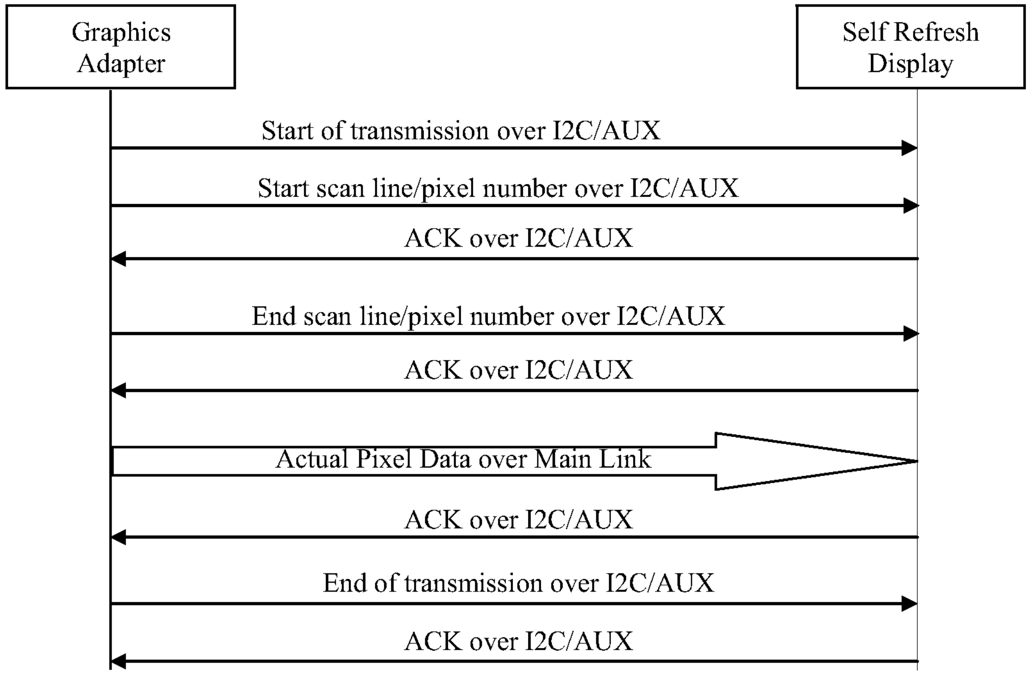
FIG. 6 shows an example manner of identifying and transmitting displayable content.

FIG. 6 gives example of transmitting displayable content. In this example, an I2C interface or Display Port compatible interface can be used. If a Display Port interface is used, the AUX channel can be used to communicate which lines and pixel numbers are to be written to a buffer accessible by a self refresh display device. Of course, other types of interfaces can be used such as but not limited to I2C and AUX. The messages described in the following table can be used by a graphics adapter to communicate with a self refresh display.

| NAME | BRIEF DESCRIPTION |
|---|---|
| Start of transmission | Indicates a group of lines or pixels will be transmitted to a buffer of a self refresh display logic. |
| Start scan line number or pixel number | Indicates a starting line number or pixel number that will be transmitted to a buffer of a self refresh display logic. |
| End scan line number or pixel number | Indicates an ending line number or pixel number that will be transmitted to a buffer of a self refresh display logic. |
| Acknowledge (ACK) | Indicates acknowledgement of previously transmitted command or acknowledgement of previously transmitted data. |
| Resend if sink encounters error | If there is a NACK received, the source will send the same data again. The source can implement a buffering technique and purge entries in a buffer only after an ACK is received for the given line/pixel numbers. |
| End of transmission | Indicates that the transmission of lines or pixels has concluded. |

Figure 7:
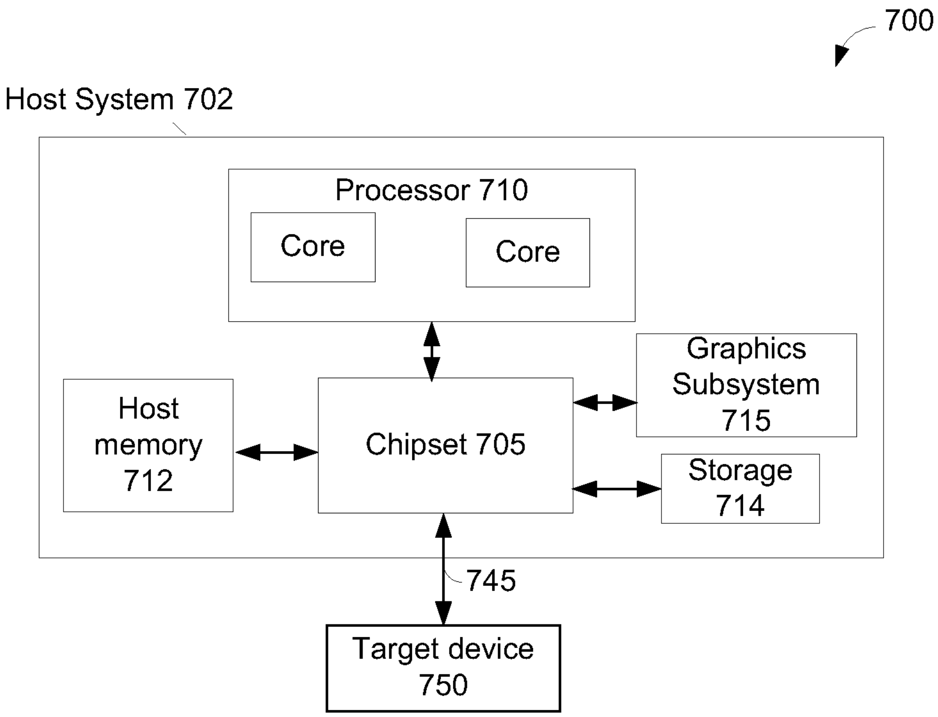
FIG. 7 depicts a system in accordance with an embodiment.

FIG. 7 depicts a system 700 in accordance with an embodiment. System 700 may include a source device such as a host system 702 and a target device 750. Host system 702 may include a processor 710 with multiple cores, host memory 712, storage 714, and graphics subsystem 715. Chipset 705 may communicatively couple devices in host system 702. Graphics subsystem 715 may process video and audio. Host system 702 may also include one or more antennae and a wireless network interface coupled to the one or more antennae (not depicted) or a wired network interface (not depicted) for communication with other devices. Host system 702 may include the system of FIG. 2 to identify and transfer modified scan lines and pixels to a buffer used by a self refresh display logic. Wired or wireless techniques can be used to transfer modified scan lines and pixels to a buffer accessible to a display.

For example, host system 702 may transmit commands to capture an image and power down components to target device 750 using extension packets transmitted using interface 745. Interface 745 may include a Main Link and an AUX channel, both described in Video Electronics Standards Association (VESA) DisplayPort Standard, Version 1, Revision 1a (2008) and Version 1, 2 (2009). In various embodiments, host system 702 (e.g., graphics subsystem 715) may form and transmit communications to target device 750 to write portions of a buffer with modified scan lines and modified pixels.

Target device 750 may be a display device with capabilities to display visual content and broadcast audio content. For example, target device 750 may include control logic such as a timing controller (TCON) that controls writing of pixels as well as a register that directs operation of target device 750.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

Embodiments of the present invention may be implemented as any or a combination of: one or more microchips or integrated circuits interconnected using a motherboard, hardwired logic, software stored by a memory device and executed by a microprocessor, firmware, an application specific integrated circuit (ASIC), and/or a field programmable gate array (FPGA). The term “logic” may include, by way of example, software or hardware and/or combinations of software and hardware.

Embodiments of the present invention may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments of the present invention. A machine-readable medium may include, but is not limited to, floppy diskettes, optical disks, CD-ROMs (Compact Disc-Read Only Memories), magneto-optical disks, ROMs (Read Only Memories), RAMs (Random Access Memories), EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

The drawings and the forgoing description gave examples of the present invention. Although depicted as a number of disparate functional items, those skilled in the art will appreciate that one or more of such elements may well be combined into single functional elements. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of the present invention, however, is by no means limited by these specific examples. Numerous variations, whether explicitly given in the specification or not, such as differences in structure, dimension, and use of material, are possible. The scope of the invention is at least as broad as given by the following claims.

What is claimed is:

1. A computer-implemented method comprising:

determining whether a request to render a rectangle comprises a request to render a rectangle on a display;

determining scan and pixel lines associated with the rectangle;

informing a self refresh display logic that pixels of the scan and pixel lines are to be transmitted to a buffer accessible to the self refresh display logic; and transmitting pixels of the scan and pixel lines to the buffer, including providing the option to transmit one of (1) only modified pixels of scan and pixel lines modified from a previous displayed frame or (2) an entire frame having a plurality of pixels, and including the state where less than all of the pixels in the plurality are modified, wherein the selection between (1) and (2) depends on the position of the modified pixels in the entire frame, and depending on whether the modified pixels are scattered around a surface of a frame.

2. The method of claim 1, wherein the determining whether a request to render a rectangle comprises a request to render a rectangle on a display comprises determining whether a flip request is associated with a buffer that is to store the rectangle.

3. The method of claim 1, further comprising:

requesting overwriting of the scan and pixel lines in the buffer.

4. The method of claim 3, further comprising:

providing contents of the buffer for display.

5. The method of claim 1, further comprising:

powering down a display engine in response to completion of transmitting pixels of the scan and pixel lines to the buffer.

6. The method of claim 5, further comprising:

placing graphics memory in lower power mode in response to completion of transmitting pixels of the scan and pixel lines to the buffer.

7. The method of claim 1, wherein the transmitted pixels of the scan and pixel lines comprise an entire frame of pixels in response to modified scan and pixel lines being scattered around a surface of a frame.

8. A non-transitory computer-readable medium comprising instructions, which when executed by a machine, cause the machine to:

receive a request to render a drawing, wherein the request identifies whether the drawing is to be written to a frame buffer and the frame buffer is to be flipped;

identify each rectangle associated with the request that is changed from a previous display of a frame;

determine line and pixel locations of each rectangle associated with the request that is changed from a previous display of a frame; and provide an option to request transmission to a target local display buffer of one of (1) only modified pixels of the images associated with the determined line and pixel locations or (2) an entire frame buffer having data of a plurality of pixels, and includes a state wherein less than all of the pixels in the plurality are modified, wherein the selection between (1) and (2) is based on the position of the modified pixels in the entire frame, and depending on whether the modified pixels are scattered around a surface of a frame.

9. The medium of claim 8, wherein the machine is to request transmission of images of an entire frame buffer when the determined line and pixel locations are scattered around a frame.

10. The medium of claim 8, wherein to request transmission of one of the images associated with the determined line and pixel locations comprises a request to overwrite the determined scan and pixel lines in the target buffer.

11. The medium of claim 8, further comprising instructions that cause a computer to:

request powering down a display engine in response to transmitting one of the images associated with the determined line and pixel locations or an entire frame buffer to the target buffer.

12. The medium of claim 8, further comprising instructions that cause a computer to:

place a graphics memory in lower power mode in response to transmitting one of the images associated with the determined line and pixel locations or an entire frame buffer to the target buffer.

13. The medium of claim 8, further comprising instructions that cause a computer to:

request refresh of a display using contents of the target buffer.

14. A system comprising:

a display device;

a target buffer accessible to the display device; and a host system configured to:

determine modified scan lines and pixel locations relative to a previously displayed frame based on a request to draw a rectangle and provide the option to transmit one of:

only modified pixels associated with the request and to the target buffer, wherein the pixels comprise the pixels of the modified scan lines and pixel locations, and an entire frame having a plurality of pixels, and including the state where less than all of the pixels in the plurality are modified, wherein the selection depends on the position of the modified pixels in the entire frame, and depending on whether the modified pixels are scattered around a surface of a frame.

15. The system of claim 14, wherein the target buffer is to overwrite pixels with the transmitted pixels.

16. The system of claim 14, wherein to determine modified scan lines and pixels relative to a previously displayed frame based on a request to draw a rectangle, the host system is to determine whether a flip request is associated with a buffer that stores the rectangle.

17. The system of claim 14, wherein to transmit pixels, the host system is to transmit an entire frame stored in a frame buffer instead of pixels of the modified scan lines and pixel locations in response to the pixels of the modified scan lines and pixel locations being scattered around a surface of a frame.

18. The system of claim 14, wherein the host system comprises a display engine and a memory device and wherein the host system is to reduce power consumption of the display engine and the memory device in response to transmission of pixels to the target buffer.

19. The system of claim 14, further comprising a controller, wherein the host system is to inform the controller of scan lines and pixel locations of the transmitted pixels.

20. The system of claim 14, further comprising a controller, wherein the controller is to refresh the display with image from the target buffer.

* * * * *